United States Patent [19]
Lin

[11] Patent Number: 6,032,242
[45] Date of Patent: Feb. 29, 2000

[54] METHODS AND SYSTEMS FOR GENERATING ALTERNATE AND ZIGZAG ADDRESS SCANS BASED ON FEEDBACK ADDRESSES OF ALTERNATE AND ZIGZAG ACCESS PATTERNS

[75] Inventor: Tzu-An Lin, Taipei, Taiwan

[73] Assignee: Industrial Technology Research Institute, Taiwan

[21] Appl. No.: 08/950,968

[22] Filed: Oct. 15, 1997

[51] Int. Cl.[7] .................................................. G06F 9/32
[52] U.S. Cl. ........................................ 711/217; 711/219
[58] Field of Search .................................. 345/508, 213; 348/714, 206; 377/10; 358/451; 382/246; 365/230.01; 711/217, 218, 219, 220

[56] References Cited

U.S. PATENT DOCUMENTS

| | | | |
|---|---|---|---|
| 4,468,729 | 8/1984 | Schwartz | 711/172 |
| 4,564,865 | 1/1986 | Yamada | 358/451 |
| 5,296,938 | 3/1994 | Nakayama . | |
| 5,313,299 | 5/1994 | Ishihara . | |
| 5,394,171 | 2/1995 | Rabii . | |
| 5,455,860 | 10/1995 | Hirashma | 380/5 |
| 5,479,466 | 12/1995 | Kim . | |
| 5,537,224 | 7/1996 | Suzuoki et al. . | |
| 5,548,709 | 8/1996 | Hannah et al. . | |
| 5,555,321 | 9/1996 | Ogura et al. . | |
| 5,594,846 | 1/1997 | Donovan . | |
| 5,604,540 | 2/1997 | Howe . | |
| 5,610,873 | 3/1997 | Lee | 365/230.01 |
| 5,812,701 | 9/1998 | Chen | 382/246 |
| 5,828,384 | 10/1998 | Iwasaki et al. | 345/508 |

Primary Examiner—B. James Peikari
Attorney, Agent, or Firm—Christensen O'Connor Johnson & Kindness PLLC

[57] ABSTRACT

Methods and systems for generating alternate and zigzag address scans in a reconfigured two-dimensional map under the MPEG-1 and MPEG-2 are provided. In one embodiment, a control signal generator determines the subsequent alternate address based on the present alternate address. In another embodiment, the control signal generator determines the subsequent zigzag address based on the present zigzag address. The subsequent address is generated by incrementing, decrementing, or resetting a pair of up/down counters that are coupled to the inputs of the control signal generator.

29 Claims, 13 Drawing Sheets

METHODS AND SYSTEMS FOR GENERATING ALTERNATE AND ZIGZAG ADDRESS SCANS BASED ON FEEDBACK ADDRESSES OF ALTERNATE AND ZIGZAG ACCESS PATTERNS

FIELD OF THE INVENTION

The present invention relates generally to data compression and decompression, and more particularly, to generating alternate and zigzag address scans for various established industrial video standards.

BACKGROUND OF THE INVENTION

The Motion Picture Experts Group (MPEG) defines MPEG-1 and MPEG-2 standards for achieving compatibility among several image compression and decompression techniques. In MPEG-2, for example, address scanning techniques include scanning the result of a discrete cosine transform (DCT) by alternate address scan and zigzag address scan. A publication by MPEG entitled "Generic Coding of Moving Pictures and Associates Audio Information: Video" is hereby incorporated by reference in its entirety to provide detailed information about the MPEG-2 standard. Alternate and zigzag address scans have also been adopted and used in other video coding standards, such as the international telecommunication union-telecommunication standard sector (ITU-T) H.263 entitled "Video Coding for Low Bitrate Communication." The zigzag address scan has further been adopted and used in ITU-T H.261 coding standard entitled "Video CODEC for Audio Visual Services at Px64 kbit/s."

In FIG. 1, there is shown a general flowgraph of the process of compression and decompression of video images. During data transmission, a variable-length decoding circuit 1 compresses coded data containing a digital representation of video signals for the storage media. An inverse scan 2 sequentially arranges the quantization coefficients by an alternate scanning or zigzag scanning process. An inverse quantization 3 multiplies the coded data by an inverse quantization coefficient. The coded data are then multiplied by Inverse Discrete Cosine Transform (IDCT) coefficients in the IDCT 4 to obtain two-dimensional data in spatial domain. The motion compensation 5 generates decoded pels.

Figures 2A, 2B:
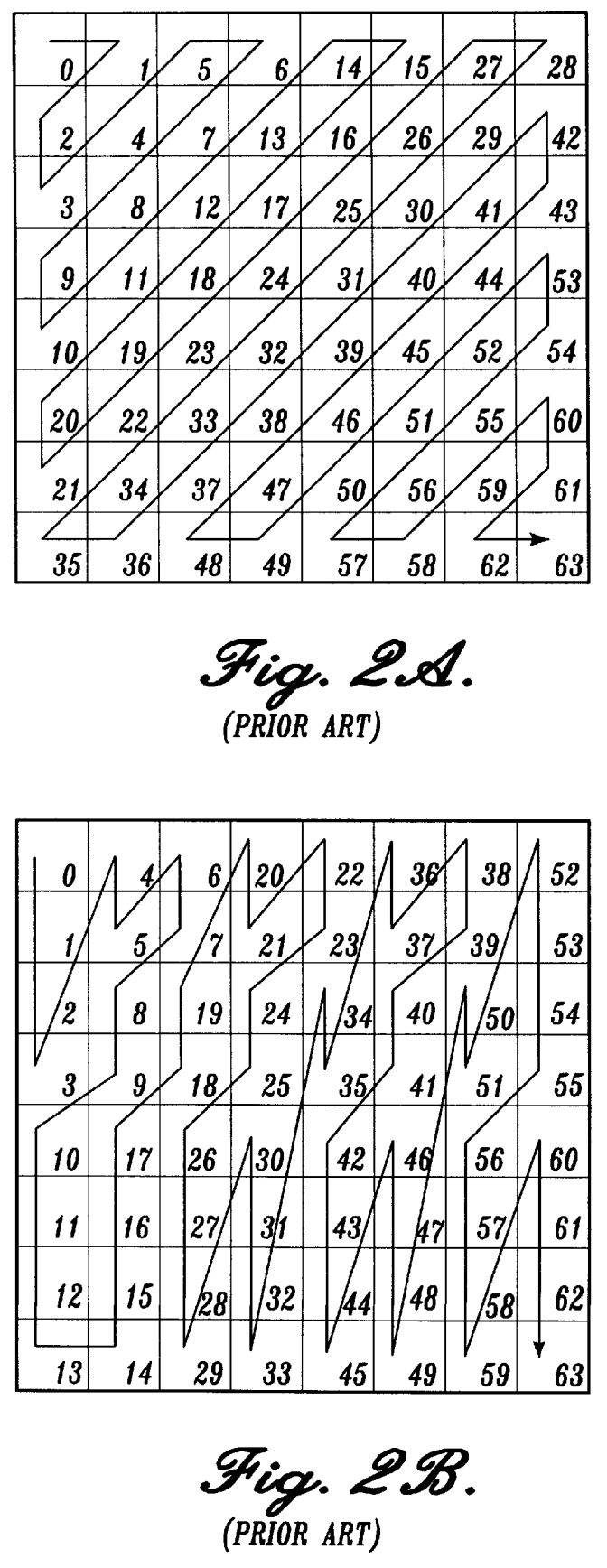

FIG. 2A is a prior art diagram of an access pattern in a zigzag scan. In zigzag scanning, the scanning is performed in a zigzag pattern starting from the low-frequency area, in which large coefficient values are concentrated, permitting transmission of large coefficient values intact but omits the zeros occurring in high frequency areas. The progression of the access pattern in the zigzag pattern starts at pixel 0, moving to pixel 1, then moving to pixels 2, 3, 4, and so on as shown in FIG. 2A until pixel 63, at which time the procedure returns to pixel 0 and starts the access pattern again. The zigzag scan pattern as shown in FIG. 2A is a recognized format for the standard implementation of a conventional zigzag address scan. FIG. 2B shows a prior art flowgraph of a traditional access pattern in an alternate pattern under MPEG-2. The progression of the access pattern in the alternate pattern begins at the pixels 0, 1, 2, and 3, then jumps to the pixel 4, and continues to process in accordance to the alternate scan pattern. The alternate pattern as shown in FIG. 2B is a recognized format for the standard implementation of a conventional alternate address scan under MPEG-2.

FIG. 3 is a prior art block diagram for implementing the zigzag address scan. A 6-bit counter 6 increments the value of the address locations of the video images. A look-up table 7 receives the value generated from the 6-bit counter 6 that increments the value of the address. The look-up table 7 retrieves the corresponding address location, and generates a 6-bit scan/inverse scan address. The look-up table requires a large memory capacity to store the 6-bit address locations of the zigzag address scan for MPEG-1 applications, and requires an even larger memory capacity for both zigzag and alternate scans for MPEG-2 applications.

Accordingly, it is desirable to have methods that operates with a more efficient access patterns for alternate and zigzag scans.

SUMMARY OF THE INVENTION

The present invention discloses a scanning address generator for generating address locations of two-dimensional array data stored in an alternate address format, including (1) a first up/down counter having inputs containing an up signal, a down signal, and a reset signal, and having outputs for generating an X-axis address; (2) a second up/down counter having inputs containing an up signal, a down signal, at least one reset signal, and having outputs for generating a Y-axis address; and (3) a control signal generator having a first set of inputs coupled to the outputs of the first up/down counter for receiving the X-axis address, a second set of inputs coupled to the outputs of the second up/down counter for receiving the Y-axis address, a first set of outputs coupled to the inputs of the first up/down counter, a second set of outputs coupled to the inputs of the second up/down counter, the control signal generator generating a subsequent address from the X-axis address output and Y-axis address output by controlling the up signal, the down signal, and the reset signal of the first up/down counter according to an alternate or zigzag address access pattern and by controlling the up signal, the down signal, at least one reset signal, and the third reset signal of the second up/down counter according to the alternate or zigzag address access pattern.

The access patterns for the alternate and zigzag address scans have been reconfigured in a two-dimensional map to attain spatial relationships between the addresses for the alternate and zigzag scans. These spatial relationships, represented by incrementing, decrementing, or resetting the X-axis and Y-axis addresses, serve as the basis to compute the subsequent address from the present address. The memory capacity required to store the address locations are significantly reduced by generating the subsequent address from the present address, instead of processing the address and accessing the subsequent address independently of the present address.

The present address of the access pattern in an alternate or zigzag scan is fed back to a control signal generator. The control signal generator determines the locations of the present address and generates the subsequent address based on the spatial relationship between the present address and subsequent address. The control signal generator transmits control signals to up/down counters to trigger the appropriate pins to generate the subsequent address. Each of the up/down counters contain preset pins to more expediently obtain the desirable subsequent X-axis and Y-axis address locations: three reset pins are required in the alternate address scan, while one reset pin is required for the zigzag address scan.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A–2B are access patterns for alternate and zigzag address scans;

DETAILED DESCRIPTION OF THE PREFERRED EMBODIMENTS

Figure 1:
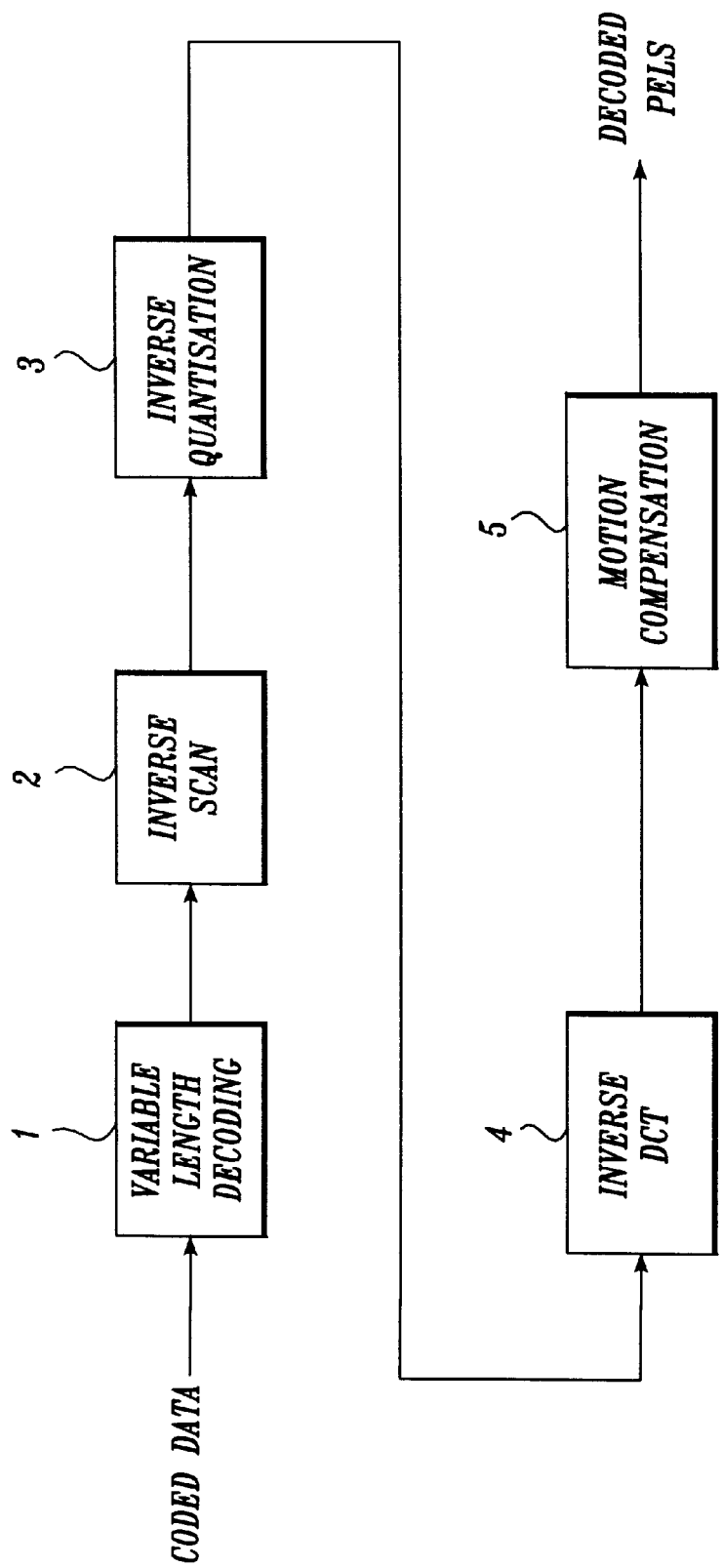
FIG. 1 is a prior art flowgraph of the general process flow of data compression of images.
Figure 3:
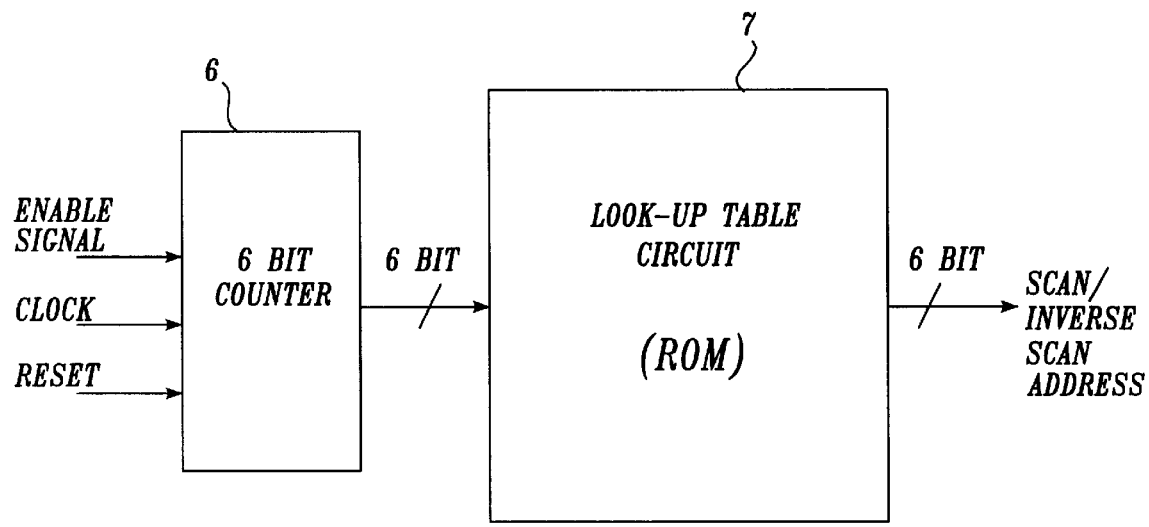
FIG. 3 is a prior art diagram for implementing a zigzag address scan.
Figure 4:
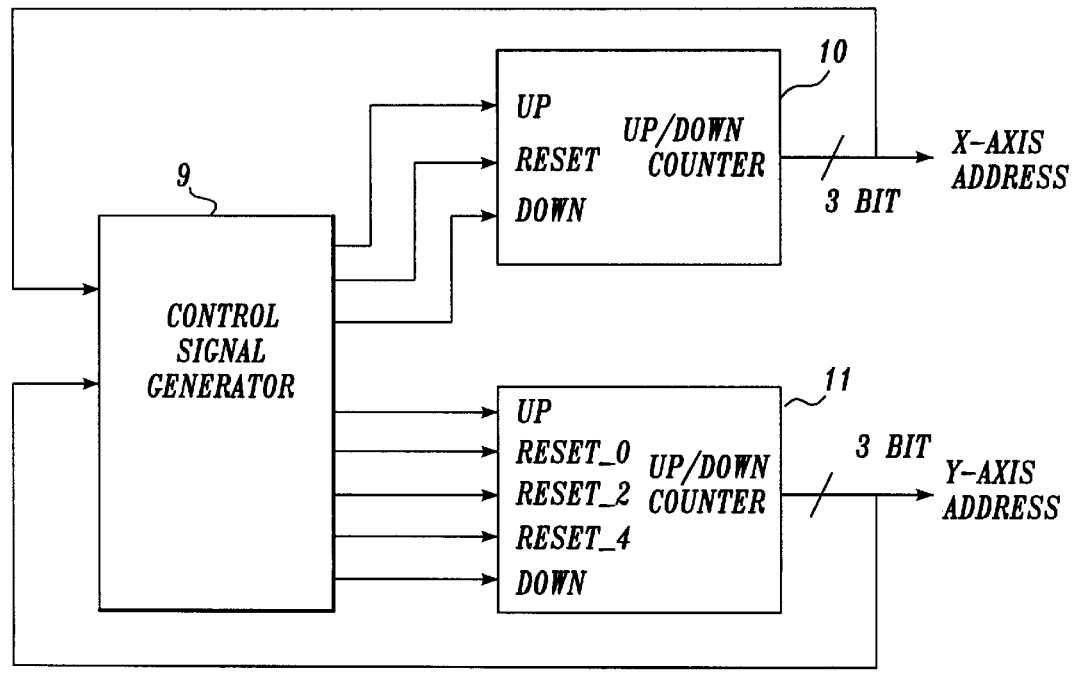
FIG. 4 is a general block diagram for implementing the alternate and zigzag address scans of the present invention.

FIG. 4 is a general block diagram for implementing an address scan generator 8 for alternate and zigzag address scans of the present invention. The alternate and zigzag address scan generator 8 includes a control signal generator 9, a first up/down counter 10, and a second up/down counter 11. The control signal generator 9 has a set of outputs that couples to a set of inputs of the first up/down counter 10 and further couples to a set of inputs of the second up/down counter 11. The first up/down counter 10 generates a 3-bit output address representing the present X-axis address where the data of the present X-axis address is fed back to a set of inputs of the control signal generator 9. The second up/down counter 11 generates a 3-bit output address representing the present Y-axis address where the data of the present Y-axis address is fed back to a set of inputs of the control signal generator 9. The first up/down counter 10 contains three input pins: an up pin, a reset pin, and a down pin. For the alternate address scan embodiment, the second up/down counter 11 contains five input pins: an up pin, a reset_0 pin, a reset_2 pin, a reset_4 pin, and a down pin. For the zigzag address scan embodiment, the second up/down counter 11 contains just three inputs pins: an up pin, a reset_0 pin, and a down pin.

The control signal generator 9 controls the operations of the first up/down counter 10 based on the value of the present X-axis address received from the 3-bit outputs of the first up/down counter 10 and the value of the present Y-axis address received from the 3-bit outputs of the second up/down counter 11. Each of the X-axis address and Y-axis address outputs has a spatial relationship relative to the next X-axis address output on a two-dimensional map. The spatial relationship between the present address outputs, including the present X-axis address and the present Y-axis address outputs, and the next X-axis address output allows the control signal generator 9 to compute the value of the next X-axis address without having to store the information of new addresses. The generation of the next X-axis address based on the present address significantly reduces the amount of memory required to store and access the X-axis addresses. In the prior art, the look-up table circuit 7 is composed of a large read-only-memory that stores the physical addresses of the X-axis addressees, and thus greatly increases the memory required to store the entire set of addresses.

Similarly, the control signal generator 9 controls the operations of the second up/down counter 11 based on the value of the present Y-axis address received from the 3-bit outputs of the second up/down counter 11 and the value of the present X-axis address received from the 3-bit outputs of the first up/down counter 10. Each of the Y-axis address and X-axis address outputs also has a spatial relationship relative to the next Y-axis address output on a two-dimensional coordinate. The spatial relationship between the present address outputs, including the present Y-axis address and the present X-axis address outputs, and the next Y-axis address output allows the control signal generator to compute the value of the next Y-axis address without having to store the entire address of the next Y-axis address. The generation of the next Y-axis scan address based on the present scan address significantly reduces the amount of memory required to store the entire Y-axis address scans.

Figures 5, 6A:
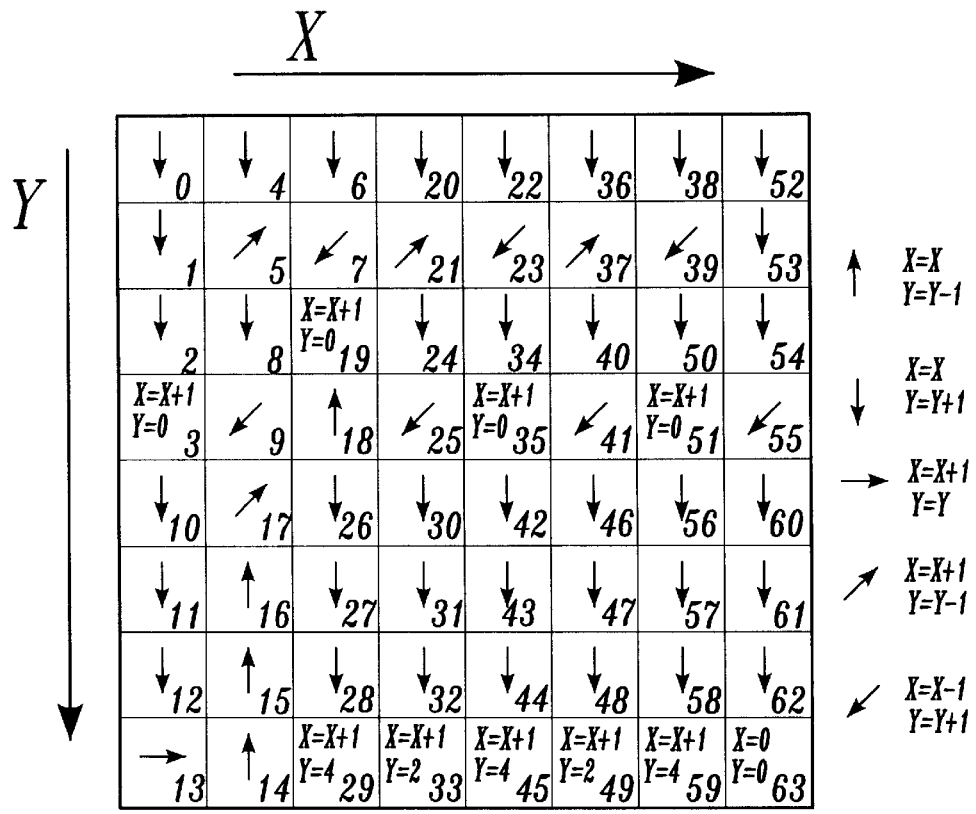
FIG. 5 is a general flowgraph showing the scan analysis of the alternate scan of the present invention.
FIGS. 6A–6B are flowgraphs of the access pattern in the alternate scan with (X,Y) at (even,even) fields.

In FIG. 5, there is shown a general flowgraph for implementing the alternate address scan of the present invention. In this embodiment, and only by way of example, the address scan map has an 8×8 block for a combined 64 pixels represented on a two-dimensional plane. Each pixel in the general flowgraph has an arrow or equations that indicate the value that is needed to be addressed to the present (X, Y) address in order to obtain the value of the next (X, Y) address according to the flow of the alternate address scan. Five types of arrows are used to represent the appropriate increment or decrement on the X-axis address and the appropriate increment or decrement on the Y-axis address. These arrow symbols are: ↑, ↓, →, ↗, and ↙. The symbol ↑ arrow denotes that X=X and Y=Y−1, representing that the X-axis address remains the same and that the Y-axis address decrements by one by activating a down signal of the second up/down counter 11. The symbol ↓ arrow denotes X=X and Y=Y+1, representing that the X-axis remains the same and that the Y-axis address increments by one by activating an up signal of the second up/down counter 11. The symbol → arrow denotes X=X+1 and Y=Y, representing that the X-axis address increments by one by activating an up signal of the first up/down counter 10 and that the Y-axis address remains the same. The symbol ↗ arrow denotes that X=X+1 and Y=Y−1, representing that the X-axis address increments by one by activating the up signal of the first up/down counter 11 and that the Y-axis address decrements by one by activating the down signal of the second up/down counter 11. The symbol ↙ arrow denotes that X=X−1 and Y=Y+1, representing that the X-axis decrements by one by activating the down signal of the first up/down counter 10 and that the Y-axis increments by one by activating the up signal of the second up/down counter 11.

Figures 6B, 7A:
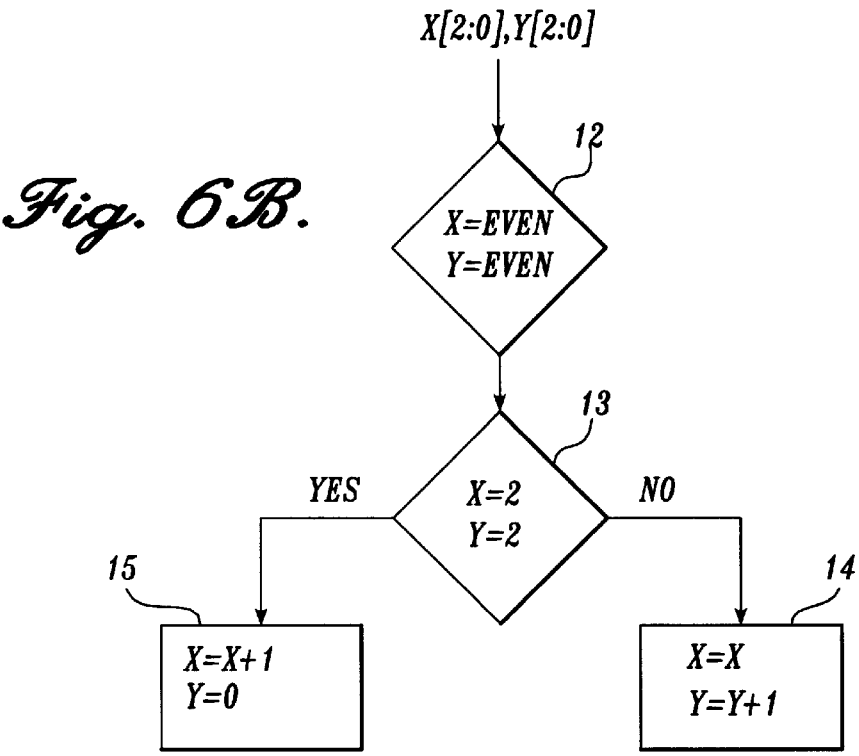
FIGS. 7A–7B are flowgraphs of the access pattern in the alternate scan with (X,Y) at (even,odd) fields.

FIGS. 6A–6B are the flowgraphs of the access pattern in the alternate scan with (X,Y) at (even,even) fields. FIG. 6A shows the scanning process of the various possible positions on the map. For all of the positions except at the (2,2) field, the scanning process increments at X=X and Y=Y+1, as indicated by the ↓ arrow. At (2,2) location, the scanning process increments the X-axis address by one and resets the Y-axis address to zero. FIG. 6B shows the flowgraph of the flow as depicted in process in FIG. 6A. At step 12, if (X,Y) contains (even,even) field, then the method proceeds to step 13. At step 13, if (X,Y) is not (2,2), then at step 14, the X-axis address remains the same and the Y-axis address increments by one. If (X,Y) is (2,2) at step 13, then at step 15, the X-axis address increments by one and the Y-axis address is reset to zero.

Figure 7B:
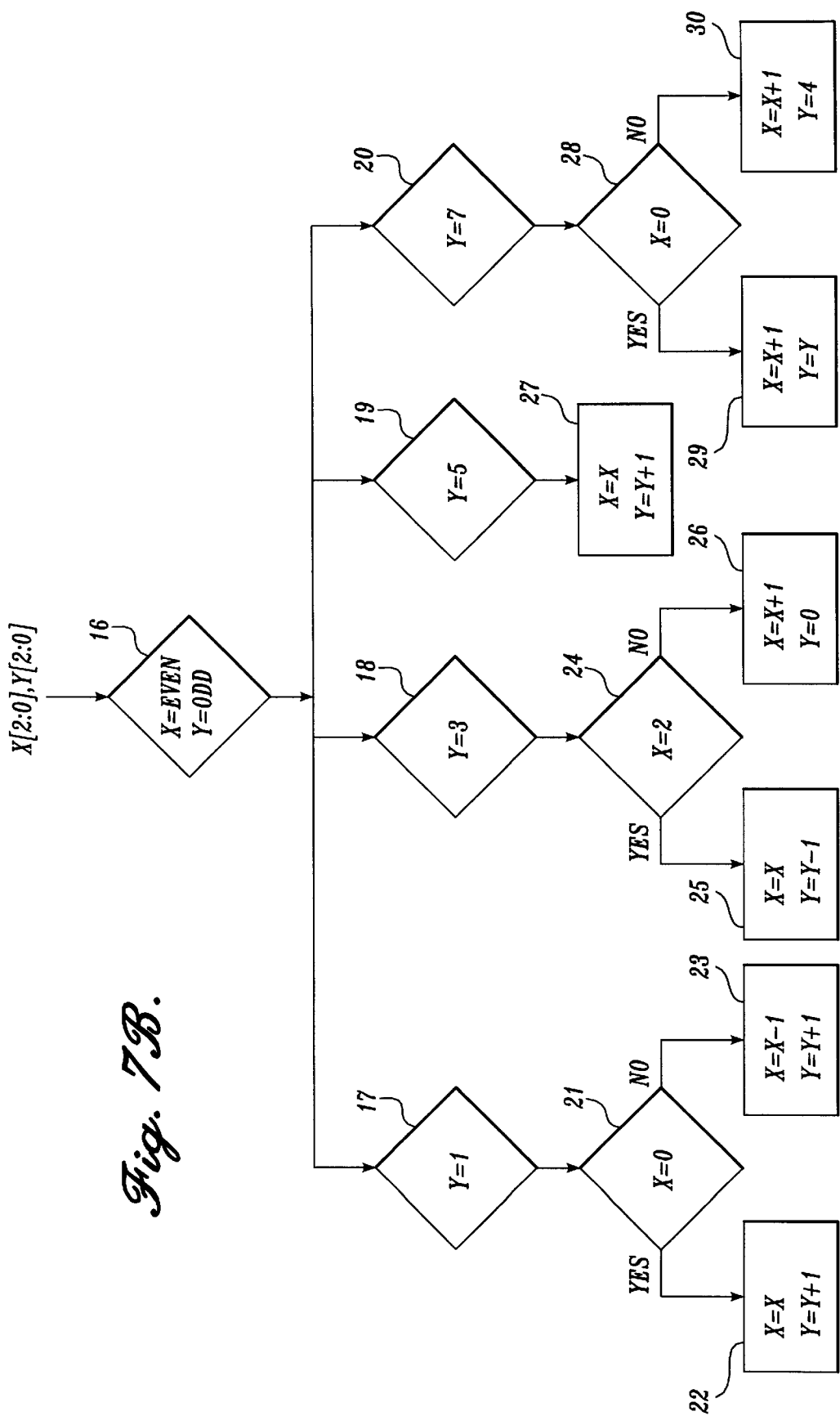

FIGS. 7A–7B are the flowgraphs of the access pattern in the alternate scan with (X,Y) at (even,odd) fields. In FIG. 7A, there is shown the scanning sequence of the alternate scan pattern on a two-dimensional map. At (0,1), (0,5), (2,5), (4,5), and (6,5) locations, the subsequent scanning address location moves in accordance to the ↓ arrow. At (2,1), (4,1), and (6,1) locations, the subsequent scanning address location moves in accordance to the ✓ arrow. The → arrow dictates the next address sequence at (0,7) location. The ↑ arrow dictates the subsequent address sequence at (2,3) location. There are six other locations on the map that move differently other than the movements provided by the arrows. At (0,3) location, the subsequent movement proceeds with the X-axis address that increments by one and the Y-axis address is reset to zero by activating the reset_0 pin of the second up/down counter 11. At (4,3) location, the subsequent movement involves incrementing the X-axis address by one and resetting the Y-axis address to zero. At (6,3) location, the next address location can be determined by incrementing the X-axis address by one and resetting the Y-axis address to zero. At (2,7) location, the subsequent movement involves incrementing the X-axis address by one and setting the Y-axis address to four by activating the reset 4 pin of the second up/down counter 11. At (4,7) location, the subsequent movement involves incrementing the X-axis address by one and resetting the Y-axis address to four. At (6,7) location, the next address location is determined by incrementing the X-axis address by one and setting the Y-axis address to four. FIG. 7B represents the movement of the map as shown in FIG. 7A. At step 16, if the (X,Y) contains (even,odd) fields, then the scan process proceeds to the following steps. The initial inquiry of Y determines the path of the process flow, where at step 17, Y=1, at step 18, Y=3, at step 19, Y=5, and at step 20, Y=7. With Y=1, if at step 21 it is determined that X=0, then at step 22, X remains the same and Y increments by one. With Y=1, if at step 21 it is determined that X≠1, then at step 23, X decrements by one and Y increments by one. With Y=3 at step 18, if at step 24 that X=2, then at step 25, X remains the same but Y decrements by one. With Y=3 at step 18, if at step 24 X≠2, then X increments by one and Y resets to zero. If Y=5 at step 19, then at step 27, X remains the same but Y increments by one. With Y=7 at step 20, if at step 28 X=0, then at step 29, X increments by one and Y remains the same. With Y=7 at step 20, if at step 28 that X≠0, then at step 30, X increments by one and Y is reset to four.

Figures 8A, 8B:
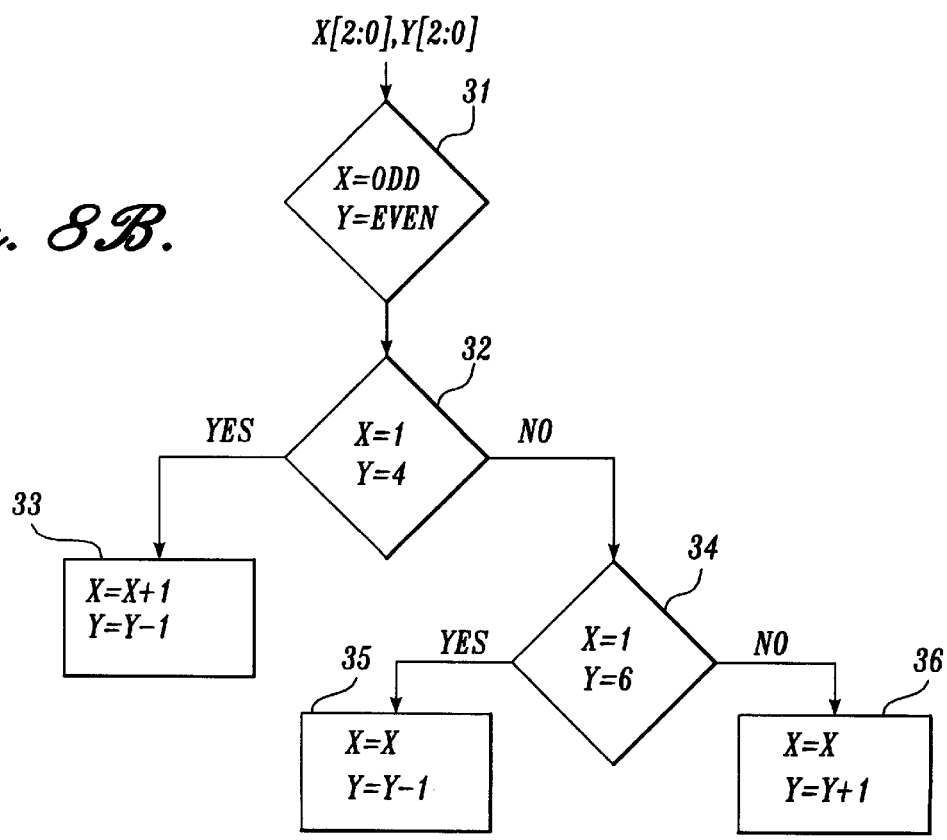
FIGS. 8A–8B are flowgraphs of the access pattern in the alternate scan with (X,Y) at (odd,even) fields.

FIGS. 8A–8B are the flowgraphs of the alternate scan with the X-axis address at odd field and Y-axis address at even field. FIG. 8A shows the access pattern of (odd,even) fields on a two-dimensional map. At address locations (1,0), (1,2), (3,0), (3,2), (3,4), (3,6), (5,0), (5,2), (5,4), (5,6), (7,0), (7,2), (7,4), and (7,6), the subsequent scanning moves in accordance to the ↓ arrow, where the X-axis address remains the same and the Y-axis address increments by one. The ↗ arrow dictates the scanning movement at address location 17 in which the X-axis address increments by one and the Y-axis address decrements by one. The ↑ arrow dictates the scanning movement at address location 15 in which the X-axis address remains the same and the Y-axis address decrements by one. FIG. 8B shows the flow process of the access pattern for accessing pixels belonging to an odd field in the X-axis address locations and an even field in the Y-axis address locations. At step 31, the control signal generator 9 determines if a field matches within (odd,even) fields. If (odd,even) fields exist, at step 32, the address scan generator 8 determines whether the field contains (1,4) field. If the field equals to (1,4) location, at step 33, the X-axis address increments by one and the Y-axis address decrements by one. If the field does not match (1,4) location, the process proceeds to step 34 to determine if the field match (1,6) location. If the field matches (1,6) location, at step 35, the X-axis address remains the same while the Y-axis address decrements by one. If the field does not match (1,6) location, at step 36, the X-axis address remains the same while the Y-axis address increments by one.

Figure 9A:
FIGS. 9A–9B are flowgraphs of the access pattern in the alternate scan with (X,Y) at (odd,odd) fields.
Figure 9B:
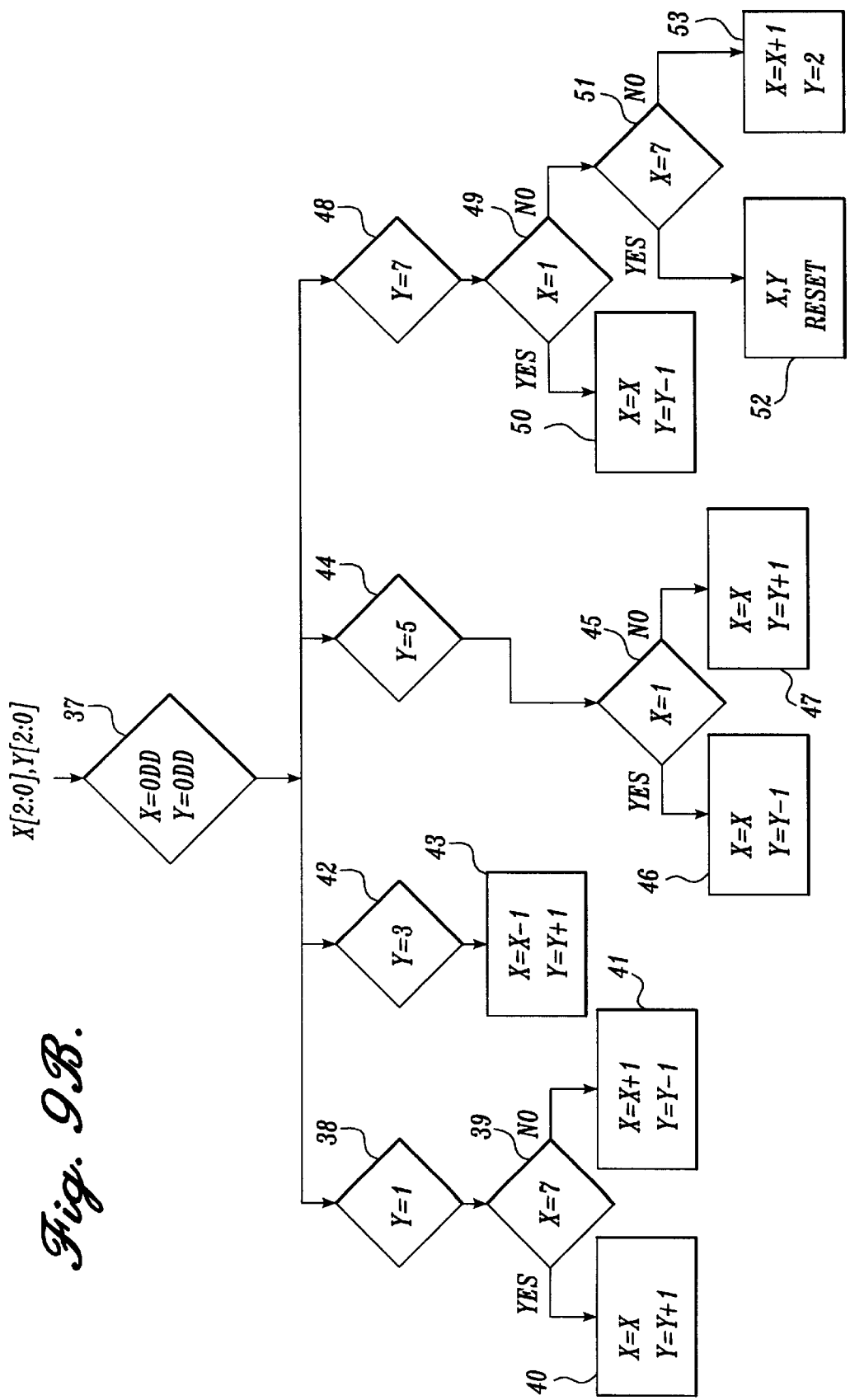

FIGS. 9A–9B are the flowgraphs of the alternate scan with the X-axis address at odd field and the Y-axis address at odd field. FIG. 9A shows an access pattern of (odd,odd) fields in a two-dimensional map. At address locations (1,5) and (1,7), the scanning process moves according to the ↑ arrow, where the X-axis address remains the same and the Y-axis address decrements by one. At address locations (3,5), (5,5), (7,1), and (7,5), the scanning process moves according to the ↓ arrow, where the X-axis address remains the same and the Y-axis address increments by one. The ↗ arrow dictates the scanning movement at the address locations (1,1), (3,1), and (5,1). The ✓ arrow dictates the scanning movement at the address locations (1,3), (3,3), (5,3), and (7,3). At (3,7) and (5,7) fields, the X-axis address increments by one and the Y-axis address is reset to two. At (7,7) location, the X-axis address and Y-axis address are reset to zero.

FIG. 9B shows the flow process of the access pattern of (odd,odd) fields. At step 37, the scanning address generator determines whether the field matches within the (odd,odd) fields. At steps 38 and 39, if (X=7 and Y=1), the subsequent scanning address moves by leaving the value in the X-axis address the same and incrementing the Y-axis address by one. If (X≠7 and Y=1), at step 41, the subsequent scanning address moves by incrementing the X-axis address by one and by decrementing the Y-axis address by one. At step 42, if Y=3, then at step 43 the X-axis address decrements by one and the Y-axis address increments by one. At steps 44 and 45, if (X=1 and Y=5), then at step 46, the X-axis address remains the same and the Y-axis address decrements by one. If (X≠1 and Y=5), at step 47, the X-axis address remains the same and the Y-axis address increments by one. At steps 48 and 49, if (X=1 and Y=7), the X-axis address remains the same and the Y-axis address decrements by one. At step 51, if (X=7 and Y=7), then at step 52 both the X-axis and Y-axis addresses are reset to zero. At step 53, if (X=3 and Y=7) or (X=5 and Y=7), the X-axis address increments by one and the Y-axis address is set to a value of two by activating the reset_2 pin of the second up/down counter 11.

Figures 10A, 10B:
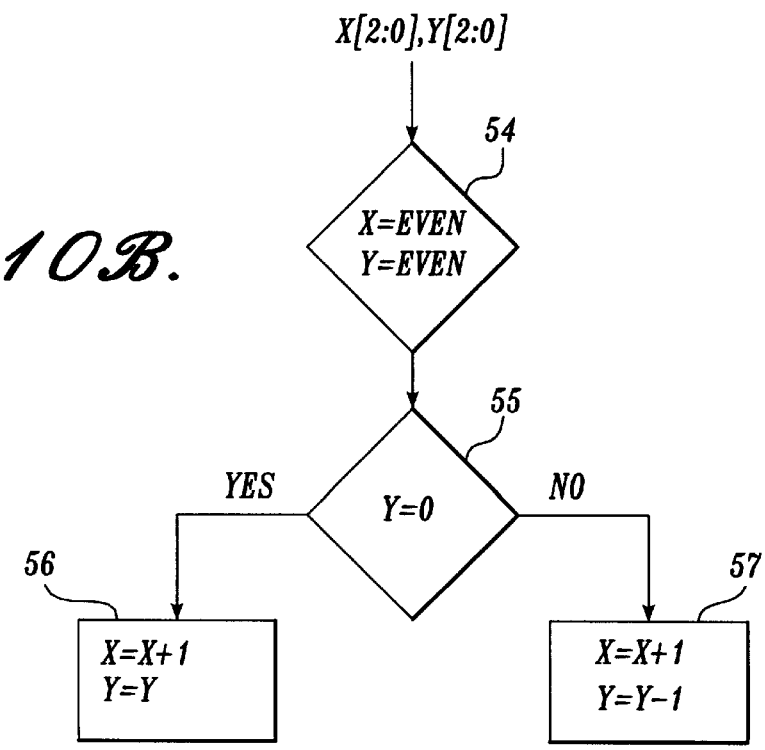
FIGS. 10A–10B are flowgraphs of the access pattern in the zigzag scan with (X,Y) at (even,even) fields.

FIGS. 10A–10B are the flowgraphs of the zigzag scan of X-axis address and Y-axis address at (even,even) fields. FIG. 10A shows the access pattern of the zigzag address scan on a two-dimensional map. At address locations (0,0), (2,0), (4,0), and (6,0), the subsequent address scan moves according to a → arrow, where the X-axis address increments by one and the Y-axis address remains the same. At address locations (0,2), (0,4), (2,2), (0,6), (2,4), (2,4), (4,2), (2,6), (4,4), (6,2), (4,6), (6,4), and (6,6), the subsequent address scan moves according to a ↗ arrow, where the X-axis address increments by one and the Y-axis address decrements by one. FIG. 10B shows the flow process of the access pattern of the zigzag pattern. At step 54, the scanning address generator determines if the field matches within the (even,even) fields. If Y contains a zero value at step 55, irrespective of the value of the X, at step 56 the X-axis address increments by one and the Y-axis address remains the same. If Y-axis address contains a nonzero value at step 55, then at step 57, the X-axis address increments by one and the Y-axis address decrements by one.

Figures 11A, 11B:
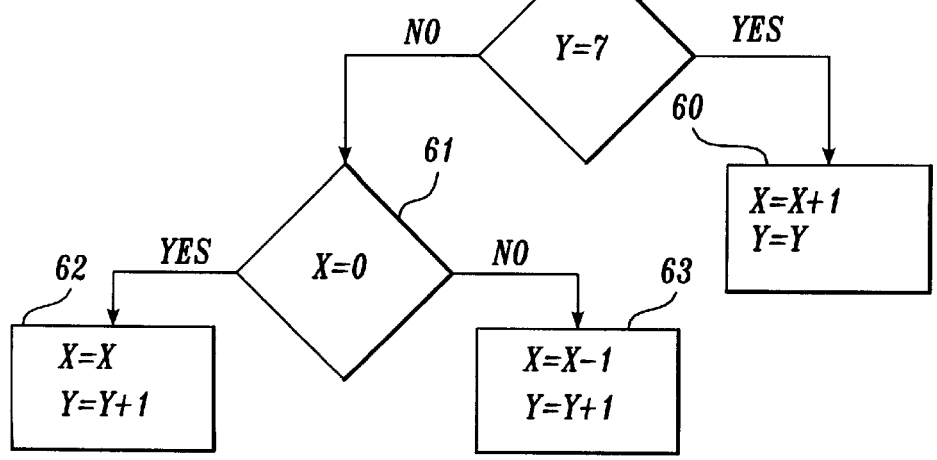
FIGS. 11A–11B are flowgraphs of the access pattern in the zigzag scan with (X,Y) at (even,odd) fields.

FIGS. 11A–11B are the flowgraphs of the zigzag scan with the X-axis address and the Y-axis address contain (even,odd) fields. FIG. 11A shows the access pattern of a zigzag scan of (even,odd) fields on a two-dimensional map. At address locations (0,1), (0,3), and (0,5), the scan address moves according to the ↓ arrow, where the X-axis address remains the same and the Y-axis address increments by one. At address locations (0,7), (2,7), (4,7), and (6,7), the scan address moves according to the → arrow, where the X-axis address increments by one and the Y-axis address remains the same. At address locations (2,1), (4,1), (2,3), (6,1), (4,3), (2,5), (6,3), (4,5), and (6,5), the scan address moves according to the ↙ arrow, where the X-axis address decrements by one and the Y-axis address increments by one. FIG. 11B shows the flow process of the zigzag pattern at (even,odd) fields. At step 58, the address generator determines if the field matches (even,odd) fields. At step 59, if the Y-axis address is 7, then at step 60 the X-axis address increments by one and the Y-axis address remains the same. At step 61, if the X-axis and Y-axis addresses contain (X=0, Y≠7) location, then at step 62, the X-axis address remains the same and the Y-axis address increments by one. At step 61, if the X-axis and Y-axis addresses contain (X=0, Y≠7), then at step 63 the X-axis address decrements by one and the Y-axis address direction increments by one.

Figures 12A, 12B:
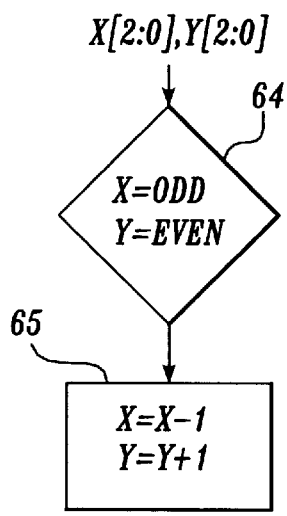
FIGS. 12A–12B are the flowgraphs of the access pattern in the zigzag scan with (X,Y) at (odd,even) fields.

FIGS. 12A–12B are the flowgraphs of the zigzag scan of X-axis address and the Y-axis address at (odd,even) fields. In FIG. 12A, there is shown a two-dimensional map of the access pattern of a zigzag scan at (odd,even) fields. All of the movements in the (odd,even) fields move according to the ↙ arrow, where the X-axis address decrements by one and the Y-axis address increments by one. FIG. 12B shows the flow process of the zigzag scan at (odd,even) fields. At step 64, the address generator scan determines if the field matches within the (odd,even) fields. If the field does match within the (odd,even) fields, then at step 65, the X-axis address decrements by one and the Y-axis address increments by one.

Figures 13A, 13B:
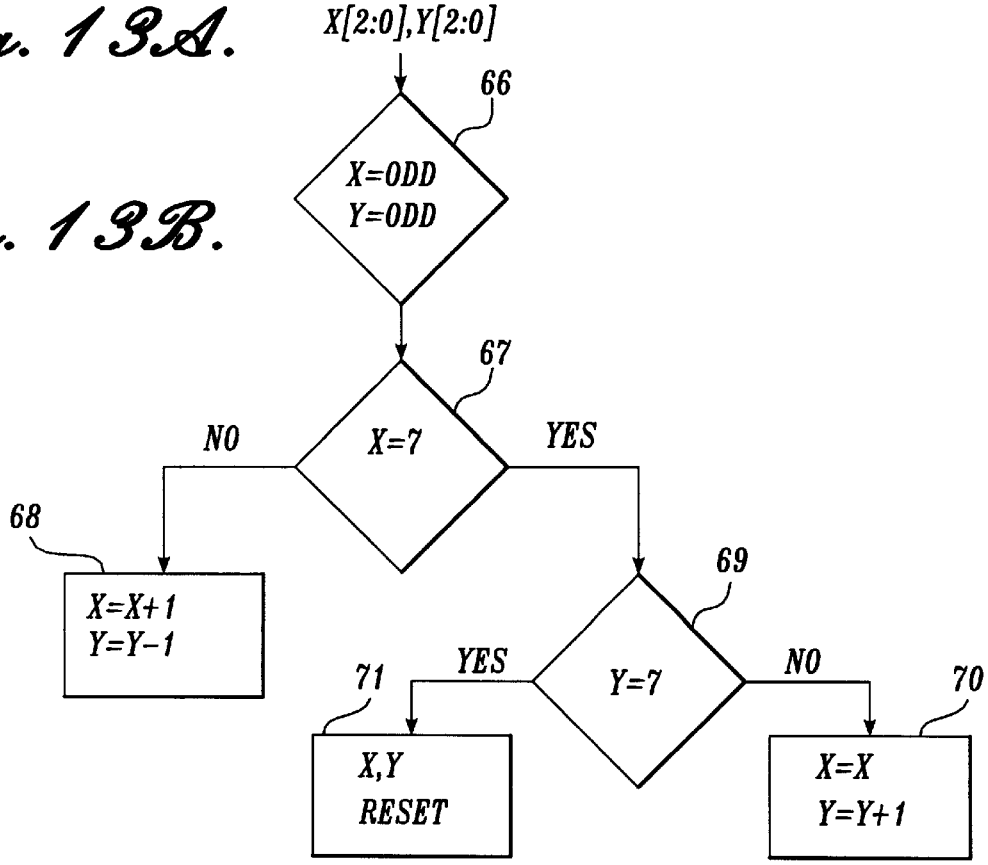
FIGS. 13A–13B are the flowgraphs of the access pattern in the zigzag scan with (X,Y) at (odd,odd) fields.

FIGS. 13A–13B are the flowgraphs of the zigzag scan of the X-axis address and the Y-axis address at (odd,odd) field. FIG. 13A shows the access pattern of the zigzag scan at (odd,odd) field on a two-dimensional map. At address locations (1,1), (1,3), (3,1), (1,5), (3,3), (5,1), (1,7), (3,5), (5,3), (3,7), (5,5) and (5,7), the address scan moves according to the ↗ arrow, where the X-axis address increments by one and the Y-axis address decrements by one. At address locations (7,1), (7,3), and (7,5), the address scan moves according to the ↓ arrow, where the X-axis address remains the same and the Y-axis address increments by one. The (odd,odd) field at address location (7,7) resets the value of the X-axis and Y-axis addresses. FIG. 13B shows a flow process of the access pattern of the zigzag scan at (odd,odd) field. At steps 66 and 67, if X≠7, then at step 68, the X-axis address increments by one and the Y-axis address decrements by one. At step 69, if (X=7 and Y≠7), then at step 70, the X-axis address remains the same and the Y-axis address increments by one. At step 71, if (X=7 and Y=7), both the X-axis and Y-axis addresses reset their respective values.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A scanning address generator for generating address locations of two-dimensional array data stored in an alternate scan address format, comprising:

a first up/down counter having inputs containing an up signal, a down signal, and a reset signal, and having outputs representing an X-axis address;

a second up/down counter having inputs containing an up signal, a down signal, a first reset signal, a second reset signal and a third reset signal, and having outputs representing a Y-axis address; and a control signal generator having a first set of inputs coupled to the outputs of the first up/down counter for receiving the X-axis address, a second set of inputs coupled to the outputs of the second up/down counter for receiving the Y-axis address, a first set of outputs coupled to the inputs of the first up/down counter, a second set of outputs coupled to the inputs of the second up/down counter, the control signal generator generating a subsequent address from the X-axis address output and Y-axis address output by controlling the up signal, the down signal, and the reset signal of the first up/down counter according to the alternate address access pattern and by controlling the up signal, the down signal, the first reset signal, the second reset signal, and the third reset signal of the second up/down counter according to the alternate address access pattern.

2. The scanning address generator of claim 1 wherein the reset signal of the first up/down counter and the first reset signal of the second up/down counter reset to numerical values of zero.

3. The scanning address generator of claim 2 wherein the second reset pin of the second up/down counter resets to a numerical value of two.

4. The scanning address generator of claim 3 wherein the third reset pin of the second up/down counter resets to a numerical value of four.

5. The scanning address generator of claim 4 wherein the first up/down counter generates an even X-axis address output and the second up/down counter generates an even Y-axis address output, the control signal generator activating the up signal of the first up/down counter and the first reset signal of the second up/down counter if the values of the X-axis address and the Y-axis address consists of (2,2), the control signal generator activating the up signal of the second up/down counter if the values of the X-axis address and the Y-axis address is not (2,2).

6. The scanning address generator of claim 4 wherein the first up/down and second up/down counter generates a set of (even,odd) address outputs, the two-dimensional array data being computed as X=X and Y=Y+1 if the set of (even,odd) address outputs is a set consists of (0,1), the two-dimensional array data being computed as X=X−1 and Y=Y+1 if the set of (even,odd) address outputs is a set consists of (≠0,1), wherein the two-dimensional array data being computed as X=X and Y=Y−1 if the set of (even,odd) address outputs is a set consists of (2,3), the two-dimensional array data being computed as X=X+1 and Y=0 if the set of (even,odd) address outputs is a set consists of (≠2,3), wherein the two-dimensional array data being computed as X=X and Y=Y+1 if the set of (even,odd) address outputs is a set consists of (x,5), wherein the two-dimensional array data being computed as X=X+1 and Y=Y if the set of (even,odd) address outputs is a set consists of (0,7), the two-dimensional array data being computed as X=X+1 and Y=4 if the set of (even,odd) address outputs is a set consists of (≠0,7).

7. The scanning address generator of claim 4 wherein the first up/down and second up/down counter generates a set of (odd,even) address outputs, the two-dimensional array data being computed as X=X+1 and Y=Y−1 if the set of field consists of (1,4), wherein the two-dimensional array data being computed as X=X and Y=Y−1 if the field consists of (1,6), wherein the two-dimensional array data being computed as X=X and Y=Y+1 if the field consists of (≠1,≠4) and (≠1,≠6).

8. The scanning address generator of claim 4 wherein the first up/down and second up/down counter generates a set of (odd,odd) address outputs, the two-dimensional array data being computed as X=X and Y=Y+1 if the field consists of (1,7), wherein the two-dimensional array data being computed as X=X+1 and Y=Y+1 if the fields consist of (1,1), (3,1) and (5,1), wherein the two-dimensional array data being computed as X=X−1 and Y=Y+1 if the value of Y is 3, wherein the two-dimensional array data being computed as X=X and Y=Y−1 if the field consists of (1,5), wherein the two-dimensional array data being computed as X=X and Y=Y+1 if the fields consist of (3,5), (5,5), and (5,7), wherein the two-dimensional array data being computed as X=X and Y=Y−1 if the field consists of (1,7), wherein the two-dimensional array data being computed as X=X+1 and Y=2 if the field consists of (3,7), wherein the two-dimensional array data being computed as X=X+1 and Y=2 if the field consists of (5,7), and wherein, wherein the two-dimensional array data being computed as X=0 and Y=0 if the field consists of (7,7).

9. A method for generating address locations scanning in two-dimensional array data in an alternate address format, comprising:

generating a present X-axis address responsive to a first set of input signals and a second set of input signals, the first set of input signals including a first up signal, a first down signal, and a first reset pin;

generating a present Y-axis address responsive to the first set and second set of input signals, the second set of input signals including a second up signal, a second down signal, a second reset signal, a third reset signal, and a fourth reset signal responsive to the present X-axis address and present Y-axis address, generating a subsequent X-axis address based on the address location of the present X-axis address and present Y-axis address; and responsive to the present Y-axis address and X-axis address, generating a subsequent Y-axis address based on the address location of the Y-axis address and the present X-axis address.

10. The method of claim 9 wherein the first reset signal of the first set of input signals resets to a numerical value of zero.

11. The method of claim 10 wherein the second reset signal of the second set of input signals resets to a numerical value of zero.

12. The method of claim 11 wherein the third reset pin of the second set of input signals resets to a numerical value of two.

13. The method of claim 12 wherein the fourth reset pin of the second set of input signals resets to a numerical value of four.

14. The method of claim 13 herein generating a Y-axis address and an X-axis address to a set of (even,even) value, the subsequent address location being computed as X=X+1 and Y=0 if the set of (even,even) address outputs is a set consists of (2,2), and wherein the subsequent address location being computed as X=X and Y=Y+1 if the set of (even,even) address outputs is not a set consists of (2,2).

15. The method of claim 13 wherein generating a Y-axis address and an X-axis address to a set of (even,odd) value, the subsequent address location being computed as X=X and Y=Y+1 if the set of (even,odd) address outputs is a set consists of (0,1), the subsequent address location being computed as X=X−1 and Y=Y+1 if the set of (even,odd) address outputs is a set consists of (≠0,1), wherein the subsequent address location being computed as X=X and Y=Y−1 if the set of (even,odd) address outputs is a set consists of (2,3), the subsequent address location being computed as X=X+1 and Y=0 if the set of (even,odd) address outputs is a set consists of (≠2,3), wherein the subsequent address location being computed as X=X and Y=Y+1 if the set of (even,odd) address outputs is a set consists of (x,5), wherein the subsequent address location being computed as X=X+1 and Y=Y if the set of (even,odd) address outputs is a set consists of (0,7), the subsequent address location being computed as X=X+1 and Y=4 if the set of (even,odd) address outputs is a set consists of (≠0,7).

16. The method of claim 13 wherein generating a Y-axis address and an X-axis address to a set of (odd,even) value, the subsequent address location being computed as X=X+1 and Y=Y−1 if the set of field consists of (1,4), wherein the subsequent address location being computed as X=X and Y=Y−1 if the field consists of (1,6), wherein the two-dimensional array data being computed as X=X and Y=Y+1 if the field consists of (≠1,≠4) and (≠1,≠6).

17. The method of claim 13 wherein generating a Y-axis address and an X-axis address to a set of (odd,odd) value, the subsequent address location being computed as X=X and Y=Y+1 if the field consists of (1,7), wherein the subsequent address location being computed as X=X+1 and Y=Y−1 if the fields consist of (1,1), (3,1) and (5,1), wherein the subsequent address location being computed as X=X−1 and Y=Y+1 if the value of Y is 3, wherein the subsequent address location being computed as X=X and Y=Y−1 if the field consists of (1,5), wherein the subsequent address location being computed as X=X and Y=Y+1 if the fields consist of (3,5), (5,5), and (5,7), wherein the subsequent address location being computed as X=X and Y=Y−1 if the field consists of (1,7), wherein the subsequent address location being computed as X=X+1 and Y=2 if the field consists of (3,7), wherein the subsequent address location being computed as X=X+1 and Y=2 if the field consists of (5,7), and wherein, wherein the subsequent address location being computed as X=0 and Y=0 if the field consists of (7,7).

18. A scanning address generator for generating address locations of two-dimensional array data stored in a zigzag address format, comprising:

a first up/down counter having inputs containing an up pin, a down pin, and a reset pin, and having outputs representing an X-axis address;

a second up/down counter having inputs containing an up pin, a down pin, and a reset pin, and having outputs representing a Y-axis address and a control signal generator having a first set of inputs coupled to the outputs of the first up/down counter, a second set of inputs coupled to the outputs of the second up/down counter, a first set of outputs coupled to the inputs of the first up/down counter, and a second set of outputs coupled to the inputs of the second up/down counter, the control signal generator generating a subsequent address from the X-axis address output and the Y-axis address output by controlling the up pin, the down pin according to the zigzag address access pattern, and the reset pin of the first up/down counter and by controlling the up pin, the down pin, the reset pin of the second up/down counter according to the zigzag address access pattern.

19. The scanning address generator of claim 18 wherein the reset pins of the first and second up/down counters reset to numerical values of zero.

20. The scanning address generator of claim 19 wherein the first up/down and second up/down counter generate a set of (even,even) address outputs, the two-dimensional array data being computed as X=X+1 and Y=Y if Y=0, and wherein the two-dimensional array data being computed as X=X+1 and Y=Y−1 if the Y≠0.

21. The scanning address generator of claim 19 wherein the first up/down and second up/down counters generate a set of (even,odd) address outputs, the two-dimensional array data being computed as X=X and Y=Y+1 if the fields consist of (0,1), (0,3), and (0,5), wherein the two-dimensional array data being computed as X=X−1 and Y=Y+1 if the fields consist of (≠0,≠7), and wherein the two-dimensional array data being computed as X=X+1 and Y=Y if the fields consist of Y=7.

22. The scanning address generator of claim 19 wherein the first up/down and second up/down counters generate a set of (odd,even) address outputs, the two-dimensional array data being computed as X=X−1 and Y=Y+1.

23. The scanning address generator of claim 19 wherein the first up/down and second up/down counter generates a set of (odd,odd) address outputs, wherein the two-dimensional array data being computed as X=X+1 and Y=Y−1 if the field consists of X≠7, wherein the two-dimensional array data being computed as resetting X and Y to zero if the field consists of (7,7), and wherein the two-dimensional array data being computed as X=X and Y=Y+1 if the fields consist of set of (7,≠7).

24. A method for generating address locations scanning in subsequent address location in zigzag address format, comprising:

generating a present X-axis address responsive to a first set of input signals, the first set of input signals including a first up signal, a first down signal, and a first reset signal;

generating a present Y-axis address responsive to a second set of input signals, the set of input signals including a second up signal, a second down signal, and a second reset signal;

responsive to the present address, generating a subsequent X-axis address based on the address locations of the present X-axis address and the present Y-axis address; and responsive to the present address, generating a subsequent Y-axis address based on the address locations of the present X-axis address and the present Y-axis address.

25. The method of claim 24 wherein the first and second reset signals reset to numerical values of zero.

26. The method of claim 25 wherein the first up/down and second up/down counter generate a set of (even,even) address outputs, the subsequent address location being computed as X=X+1 and Y=Y if Y=0, and wherein the subsequent address location being computed as X=X+1 and Y=Y−1 if the Y≠0.

27. The method of claim 25 wherein the first up/down and second up/down counters generate a set of (even,odd) address outputs, the subsequent address location being computed as X=X and Y=Y+1 if the fields consist of (0,1), (0,3), and (0,5), wherein the subsequent address location being computed as X=X−1 and Y=Y+1 if the fields consist of (≠0,≠7), and wherein the subsequent address location being computed as X=X+1 and Y=Y if the fields consist of Y=7.

28. The method of claim 25 wherein the first up/down and second up/down counters generate a set of (odd,even) address outputs, the subsequent address location being computed as X=X−1 and Y=Y+1.

29. The method of claim 25 wherein the first up/down and second up/down counter generates a set of (odd,odd) address outputs, wherein the subsequent address location being computed as X=X+1 and Y=Y−1 if the field consists of X≠7, wherein the subsequent address location being computed as resetting X and Y to zero if the field consists of (7,7), and wherein the subsequent address location being computed as X=X and Y=Y+1 if the fields consist of set of (7,≠7).

* * * * *

UNITED STATES PATENT AND TRADEMARK OFFICE
CERTIFICATE OF CORRECTION

Page 1 of 4

PATENT NO. : 6,032,242
DATED : February 29, 2000
INVENTOR(S) : T.-A. Lin

It is certified that error appears in the above-identified patent and that said Letters Patent is hereby corrected as shown below:

| COLUMN | LINE | ERROR |
|---|---|---|
| 8 (Claim 6, | 62 line 5) | before "consists of" insert --that-- |
| 8 (Claim 6, | 65 line 8) | before "consists of" insert --that-- |
| 8 (Claim 6, | 67 line 10) | before "consists of" insert --that-- |
| 9 (Claim 6, | 2 line 12) | before "consists of" insert --that-- |
| 9 (Claim 6, | 5 line 15) | before "consists of" insert --that-- |
| 9 (Claim 6, | 7 line 17) | before "consists of" insert --that-- |
| 9 (Claim 7, | 14 line 4) | "set of field" should read --set of the field-- |
| 9 (Claim 8, | 36 line 18) | delete "wherein," (first occurrence of word) |

UNITED STATES PATENT AND TRADEMARK OFFICE
CERTIFICATE OF CORRECTION

PATENT NO. : 6,032,242
DATED : February 29, 2000
INVENTOR(S) : T.-A. Lin

It is certified that error appears in the above-identified patent and that said Letters Patent is hereby corrected as shown below:

| COLUMN | LINE | ERROR |
|---|---|---|
| 9 (Claim 9, | 50 line 12) | after "signal" insert --;-- |
| 9 (Claim 9, | 57 line 19) | before "Y-axis" insert --present-- |
| 10 (Claim 14, | 4 line 1) | "herein" should read --wherein-- |
| 10 (Claim 14, | 8 line 5) | before "consists of" insert --that-- |
| 10 (Claim 14, | 10 line 7) | before "consists of" insert --that-- |
| 10 (Claim 15, | 15 line 5) | before "consists of" insert --that-- |
| 10 (Claim 15, | 17 line 7) | before "consists of" insert --that-- |

UNITED STATES PATENT AND TRADEMARK OFFICE
CERTIFICATE OF CORRECTION

Page 3 of 4

PATENT NO. : 6,032,242
DATED : February 29, 2000
INVENTOR(S) : T.-A. Lin

It is certified that error appears in the above-identified patent and that said Letters Patent is hereby corrected as shown below:

| COLUMN | LINE | ERROR |
| --- | --- | --- |
| 10 (Claim 15, | 20 line 10) | before "consists of" insert --that-- |
| 10 (Claim 15, | 22 line 12) | before "consists of" insert --that-- |
| 10 (Claim 15, | 25 line 15) | before "consists of" insert --that-- |
| 10 (Claim 15, | 27 line 17) | before "consists of" insert --that-- |
| 10 (Claim 15, | 29 line 19) | before "consists of" insert --that-- |
| 10 (Claim 16, | 33 line 4) | "set of field" should read --set of the field-- |
| 10 (Claim 17, | 55 line 18) | delete "wherein," (first occurrence of word) |

UNITED STATES PATENT AND TRADEMARK OFFICE
CERTIFICATE OF CORRECTION

PATENT NO. : 6,032,242
DATED : February 29, 2000
INVENTOR(S) : T.-A. Lin

It is certified that error appears in the above-identified patent and that said Letters Patent is hereby corrected as shown below:

| COLUMN | LINE | ERROR |
|---|---|---|
| 10 (Claim 18, | 65 line 9) | after "address" insert --;-- |

Signed and Sealed this

Eighth Day of May, 2001

*Attest:*

NICHOLAS P. GODICI

*Attesting Officer*    *Acting Director of the United States Patent and Trademark Office*